UNITED STATES PATENT OFFICE.

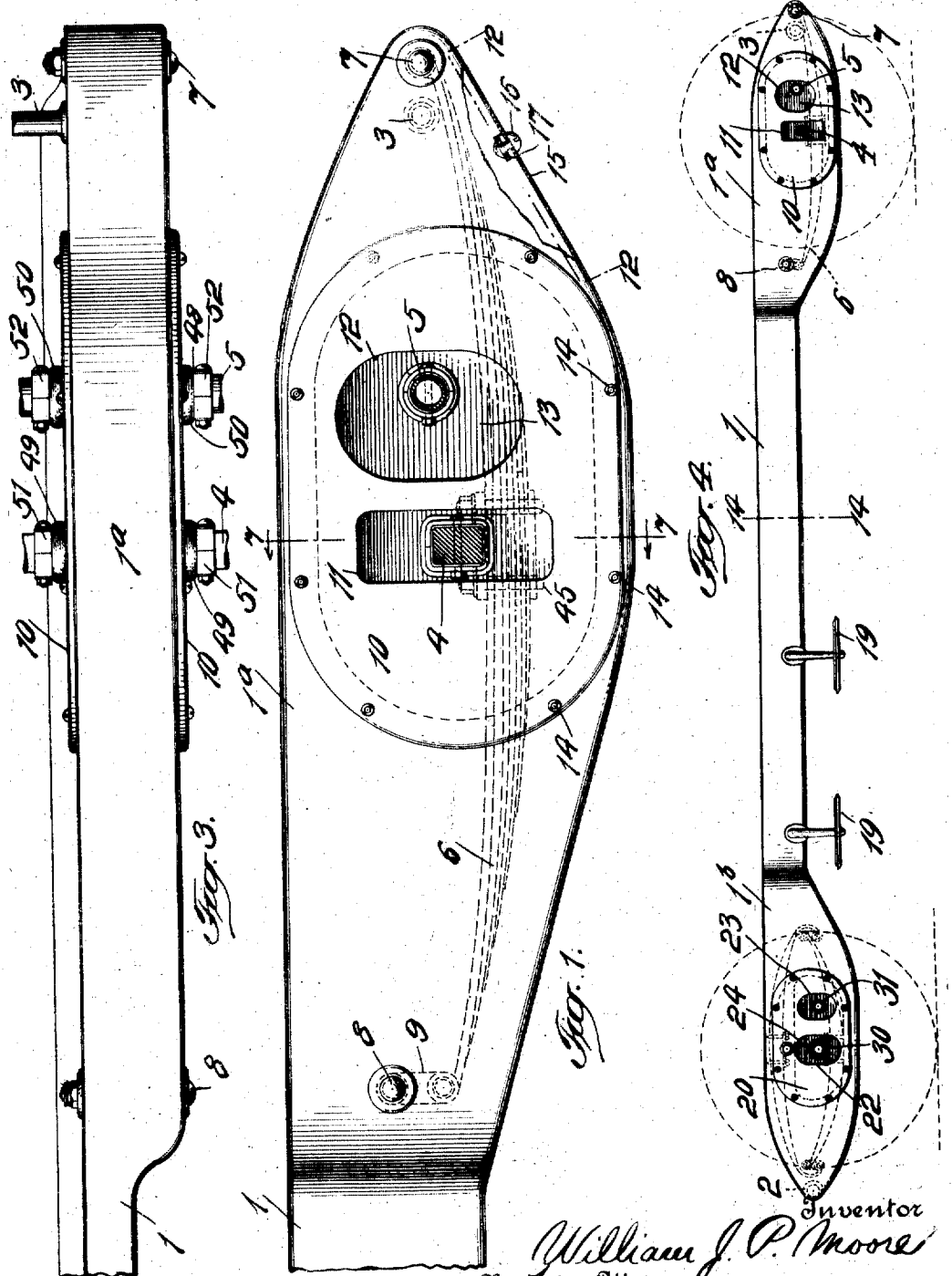

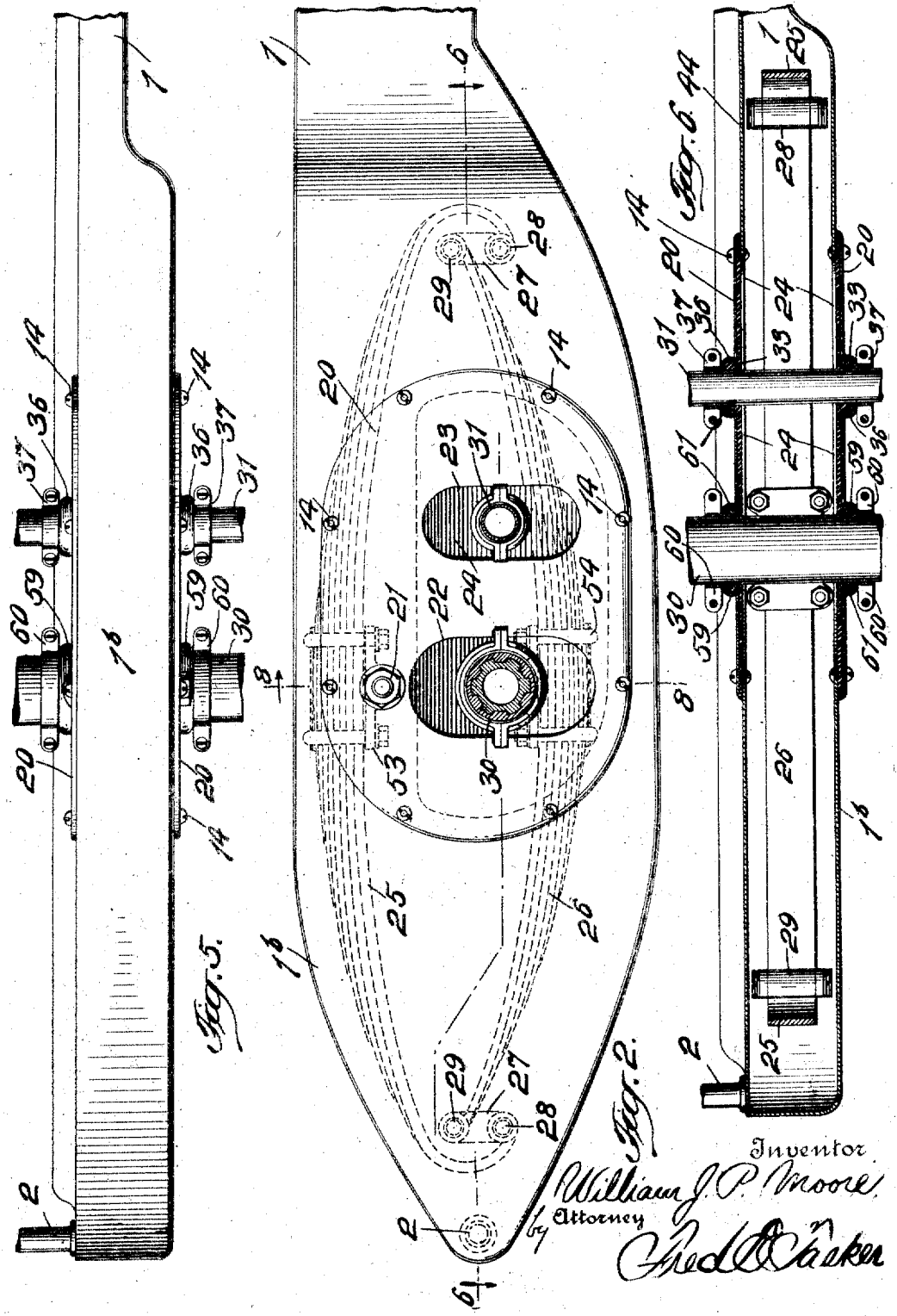

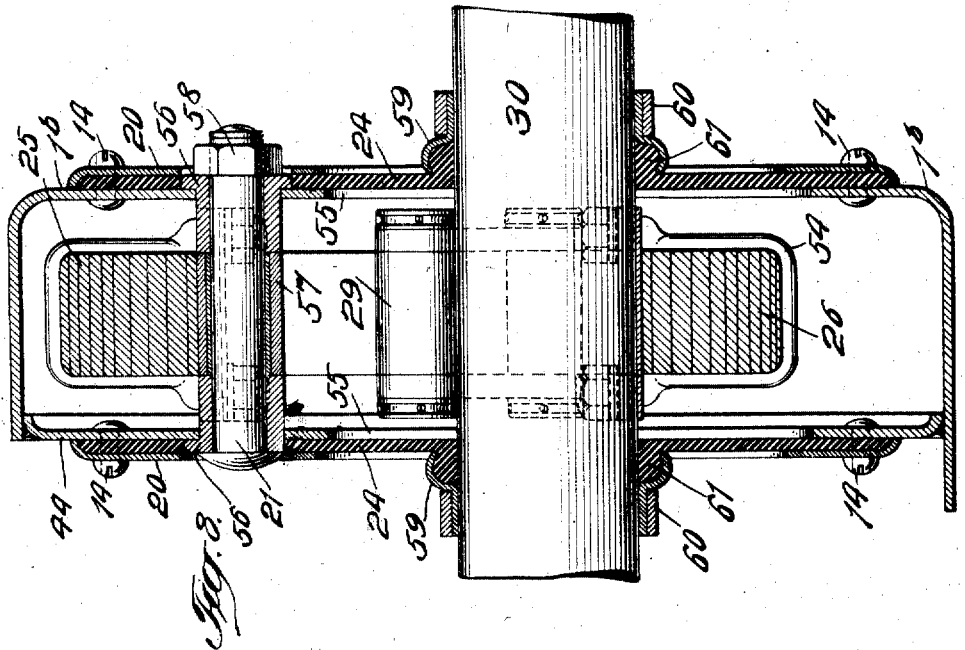

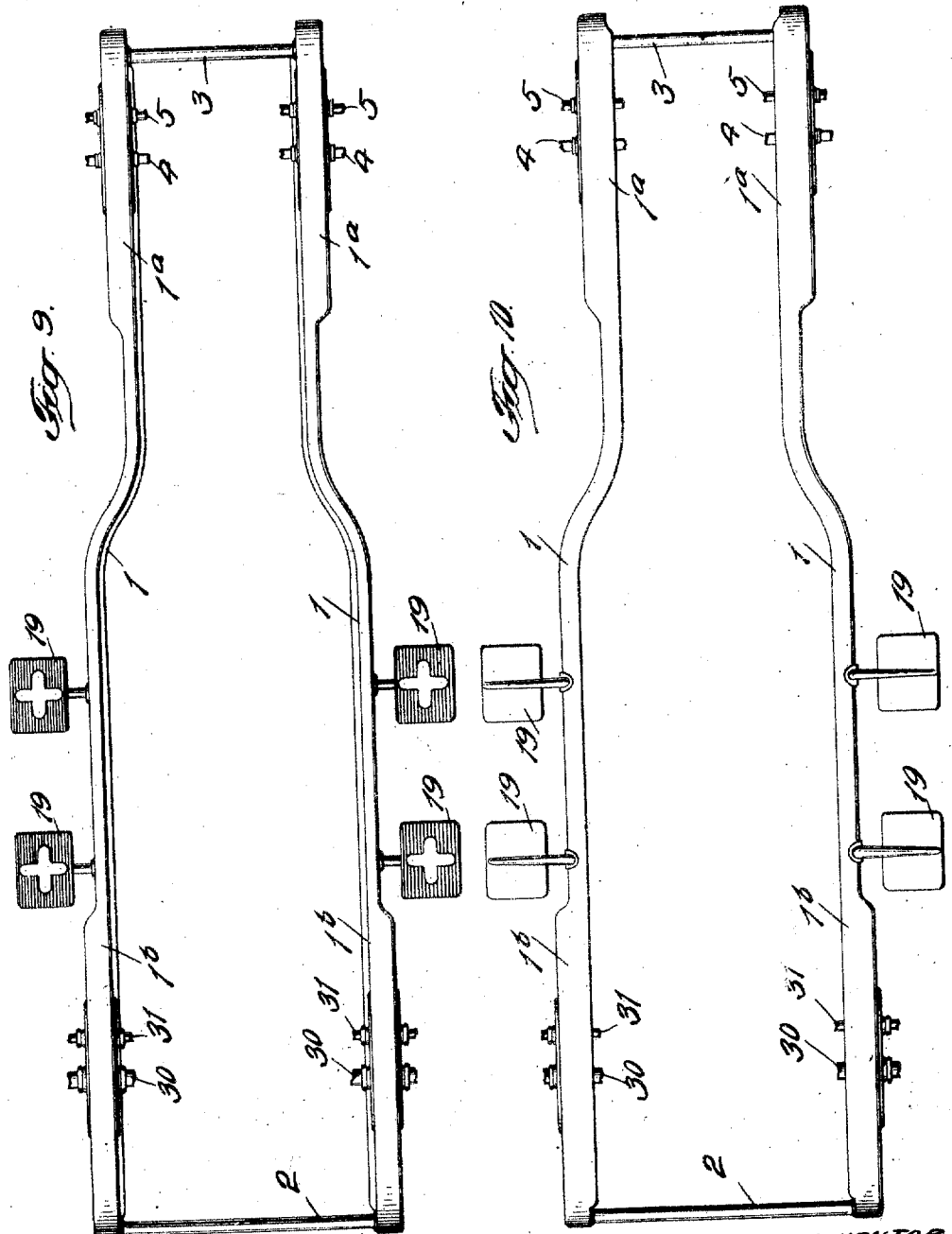

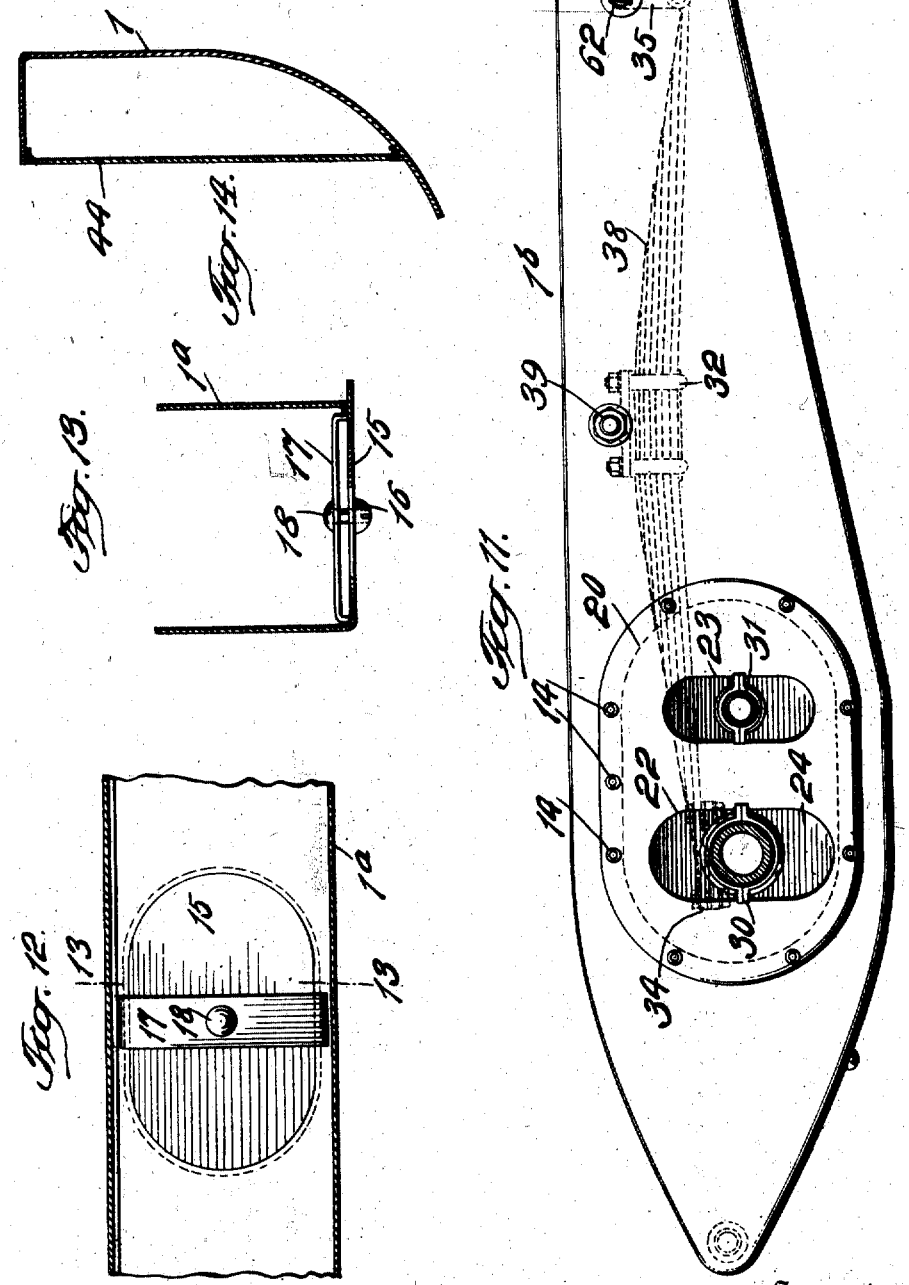

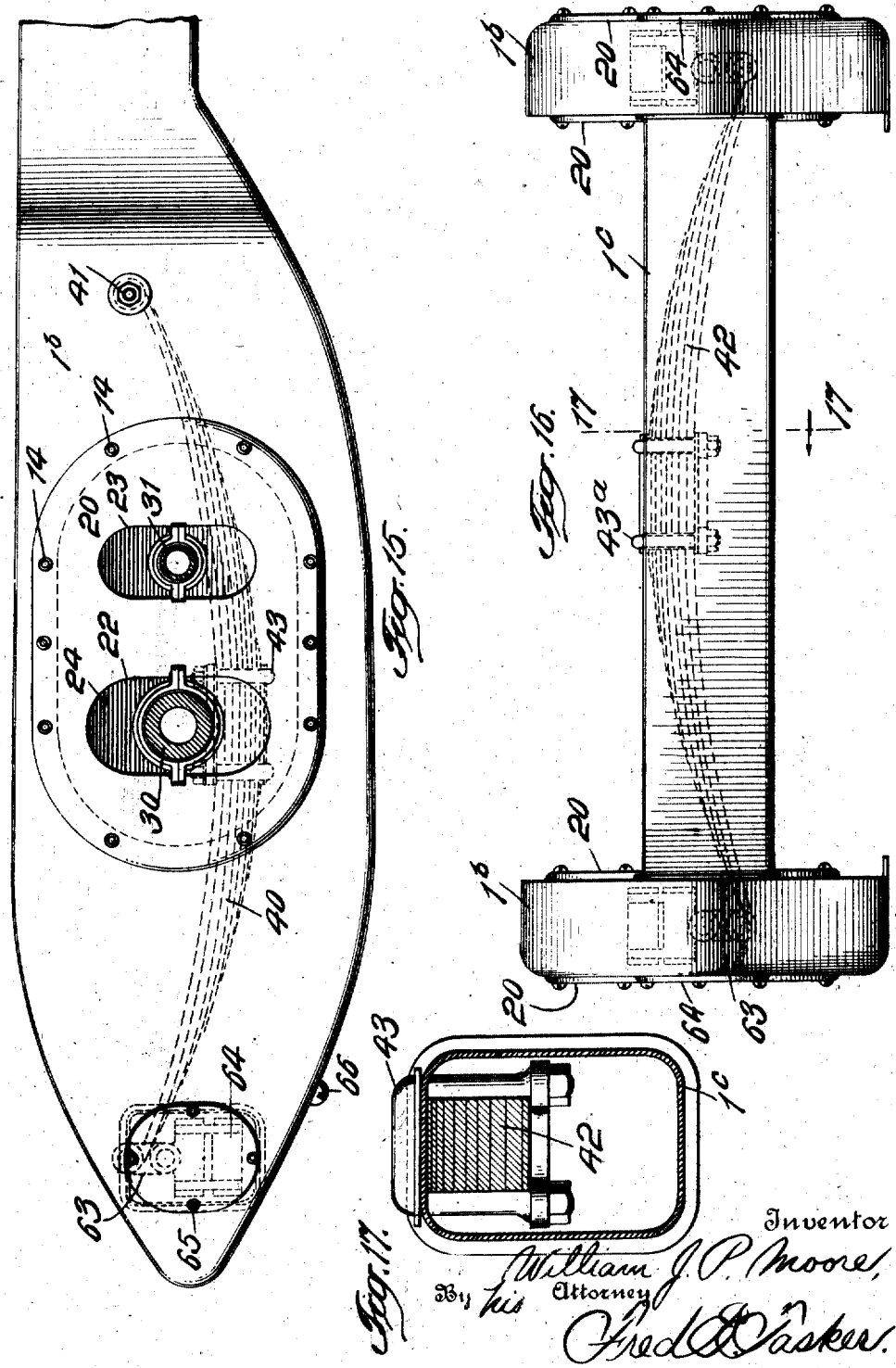

WILLIAM J. P. MOORE, OF NEW YORK, N. Y.

FRAME FOR AUTOMOBILES AND OTHER VEHICLES.

1,247,705.  Specification of Letters Patent.  Patented Nov. 27, 1917.

Application filed August 5, 1916. Serial No. 113,218.

*To all whom it may concern:*

Be it known that I, WILLIAM J. P. MOORE, a citizen of the United States, and resident of New York, in the county of New York and State of New York, have invented certain new and useful Improvements in Frames for Automobiles and other Vehicles, of which the following is a specification, reference being had therein to the accompanying drawing.

My present invention refers to a novel and ingenious frame for automobiles and similar vehicles, especially those which are of an approved design and which it is desired to keep clean, bright, and tasty in appearance at all times. One of the objects among many which might be mentioned is to increase the life of the parts and also to effectually maintain their efficiency and elasticity by effectually inclosing the springs with all their toggle joints, shackles, pins, and other connections, as well as any other resilient or operative parts, and any or all of the many working features of the draft gear of a vehicle, so that they will be protected from dirt, moisture, rust and other injury, and thus made durable, while at the same time the amplitude of the action of the springs in imparting to the automobile a cushioned riding action will not be interfered with. With the springs and the other appurtenant parts fully housed in this manner, the life of all the protected parts is greatly increased, and also the cleaning of the car is made a comparatively easy matter, inasmuch as the springs and many other parts are not exposed in running so as to collect dust, dirt, moisture, road and other oils, gravel, and the many extraneous substances which disfigure the appearance and destroy the utility of the devices. The invention, therefore, consists essentially in an automobile frame having at certain points a cellular construction, in the cells or pockets of which the springs and other working parts are intended to be covered and protected; and also in an automobile frame having at suitable points at the sides, and elsewhere if desired, cells, compartments, or recesses wherein the springs and their shackles and other supporting parts are housed and protected from collecting dust and other injurious substances; and also the invention comprises a cellular or pocketed frame having a resilient connection with the axle, or other working part, so that the said pocket may have the desired amount of play with relation to the axle so as not to disturb the natural elasticity of the springs and auxiliary devices; and the invention also may be said to comprise a cellular or pocketed frame having a flexible diaphragm in a part thereof which connects it with the axle so as to allow inter-relative movement between the axle and the frame for the purpose of giving freedom of action to the springs; and the invention further embraces numerous details and peculiarities in the construction, arrangement, and combination of the various parts, substantially as will be hereinafter described and then more particularly pointed out in the claims.

In the accompanying drawing illustrating my invention:

Figure 1 is a side elevation of the forward or one portion of the frame having therein a housing for the springs and other parts at the front on one side of the automobile or other vehicle.

Fig. 2 is a similar side elevation of the rear or other portion of the frame having therein a housing for the springs and other parts at the rear on one side of the automobile or other vehicle.

Fig. 3 is a top plan view of the parts shown in Fig. 1.

Fig. 4 is a side elevation of the entire frame.

Fig. 5 is a top plan view of the parts shown in Fig. 2.

Fig. 6 is a horizontal section on the line 6, 6 of Fig. 2.

Fig. 7 is an enlarged vertical cross-section on the line 7, 7 of Fig. 1.

Fig. 8 is an enlarged vertical cross-section on the line 8, 8 of Fig. 2.

Fig. 9 is a top plan view of my improved enhousing frame for automobiles and other vehicles.

Fig. 10 is a bottom plan view of the same.

Fig. 11 is a side elevation of the rear or one portion of my improved frame constructed in a modified way for use with an alternative arrangement of vehicle springs.

Fig. 12 is a sectional detail on the line 12, 12 of Fig. 1 showing one of the hand holes used for the purpose of inserting the springs into the housing in the frame.

Fig. 13 is a cross-sectional detail on the line 13, 13 of Fig. 12.

Fig. 14 is an enlarged cross-section on the line 14, 14 of Fig. 4.

Fig. 15 is another side elevation of the rear or one portion of my improved frame shown as applied for use with another form of vehicle spring, and hence modified in construction to suit the latter.

Fig. 16 is an end elevation of my improved automobile or other frame with the design and purpose of the form of frame indicated in Fig. 15.

Fig. 17 is a cross-sectional detail on the line 17, 17 of Fig. 16.

Similar characters of reference designate corresponding parts throughout the different figures of the drawing.

The essential idea of the invention consists in providing a vehicle frame with a cell or casing for inclosing and protecting the springs and other parts, so that they will not be exposed to dirt and injury and hence will be more durable and efficient. To this end the frame may obviously have a wide variety of modifications in its structure, being either a solid frame, a U-shaped or cellular type, or a hollow frame, or any other variety, if only certain portions thereof are so shaped as to accommodate therein the springs and their operative parts and permit the latter the same freedom of action that they ordinarily have in a vehicle. In Fig. 4 I have represented one side of this frame as a longitudinal member 1 having at its forward end an enlarged member 1ª swelled out vertically and laterally so as to provide a hollow chamber large enough to receive therein the springs at one side in the front part of the vehicle and their coöperating parts as well as other features, while the rear end of the frame 1 shows a similar enlarged member 1ᵇ which is swelled out laterally and vertically so as to provide a cell, casing, or housing of proper shape and size to accommodate therein the rear springs of a vehicle on one side thereon, all as is clearly indicated, it being understood of course that the two sides of the frame are duplicate structures.

Referring now to Fig. 9 it will be seen how the longitudinal side members 1, 1 with their enlarged ends 1ª and 1ᵇ appear in top plan view and in Fig. 10 in an inverted view. These side members 1, throughout their main length as also in the end portions 1ª and 1ᵇ, are preferably made of thin steel and hollow, being of cross-sectional form similar to that indicated in Fig. 14, where it is seen that the frame consists of steel or metal bent into hollow form and having on the inside a vertical plate 44 which is welded or riveted or otherwise united in some suitable way at its upper and lower edges to the contiguous sides of the frame. Though this is one convenient way of making the frame, yet I do not wish to be restricted thereto, inasmuch as it is possible to modify the structure in a great variety of ways, making parts thereof hollow and parts solid, or making the whole frame solid except at those points where the compartments are required for housing the springs, or otherwise diversifying and changing the structural details. This frame consisting essentially therefore of a pair of said parallel members 1, having a cellular construction at the ends thereof, as described, is held firmly together by a greater or less number of cross-rods or braces, as for example those shown in Figs. 9 and 10, where I indicate a front rod 3 and a rear rod 2. Intermediate of these two rods there may be other bracing or stiffening parts if desired. In Figs. 9 and 10 I have indicated the frame as provided with steps 19, though this is an immaterial detail which may be changed. Also, in these figures I have shown the frame with the sides 1, 1 converging forwardly so that the housings 1ª, 1ª are closer together than the rear housings 1ᵇ, 1ᵇ. This is a preferable method of arranging the members since it follows the lines of a greatly improved design in the construction of automobile frames.

Thus it will be seen that the frame contains at least four main cells or housings at the four corners thereof for the purpose of containing the four separate sets of springs or resilient devices employed for the purpose of yieldingly carrying the vehicle body upon the axles. I will explain first the construction and arrangement of the front housings 1ª, 1ª, and then the rear housings 1ᵇ, 1ᵇ. Referring first, therefore, to the front housings 1ª, 1ª and particularly to Figs. 1, 3, and 7, the general form of the housing 1ª is sufficiently indicated in the foregoing description, and it will be understood that it has an interior space, as shown in Fig. 7, large enough to receive and accommodate the type of springs used and the other parts associated therewith. Passing horizontally through the housings 1ª are the main front axle 4 and one or more transverse rods, as 5, belonging to the steering mechanism. The springs of the car may obviously be of many different kinds, as for example, elliptic, or half elliptic, cantaliver, platform, or any other kind. Oftentimes according to the present practice a half elliptic spring, the bottom half, is used at the front end of automobiles. I have, therefore, by way of example merely indicated in the drawings a plural-leaved half elliptic spring 6, the front end of which is attached to the horizontal bolt 7 mounted in the front end of the housing 1ª while the rear end of said spring 6 is connected by a link 9 with a horizontal bolt or pin 8 supported also in the housing 1ª (see Figs. 1, 3 and 7). The spring 6 is securely fastened to the axle 4 by suitable shackles 45 having the proper bolts, nuts, and other parts. Spring 6, whether of the type shown, or any other, is inserted into the housing 1ª when the parts are assembled, by using the bottom cover 15 which is readily removed from the housing 1ª when desired for the purpose of introducing the spring member. This cover 15 is shown in detail in Figs. 12 and 13. It is provided with a bolt 16 which is connected to a brace 17 having bent ends adapted to rest on the inside of the housing bottom contiguous to the edges of the hand hole in which the cover 15 fits, so that by tightening the bolt 16 and adjusting a nut, the cover 15 can be securely held in the hand hole and can be easily removed whenever desired by simply loosening the clamping parts. This or a similar hand hole will generally be used with each of the housings.

The vertical opposing walls of each housing 1ª are provided with oval or other shaped openings 46, one of these being in the main section 1ª, while the other is directly opposite to it in the inner plate 44, and these oppositely-placed similarly-shaped openings 46 are provided with covers 10 of thin metal or some other suitable material held in place by screws, bolts, or equivalent devices 14. The covers 10 are each provided with an opening 11 through which passes the axle 4, and which is elongated vertically so as to allow the housing to have considerable play vertically with reference to the axle, and also each cover 10 is provided with another opening 12 through which passes the steering member 5 and which not only extends above and below said steering member, but also for some distance at the sides thereof so that the housing may have plenty of room for play up and down with reference to said member, while at the same time the steering member may have plenty of leeway for lateral movement back and forth during the operation of the steering mechanism. Between the cover plates 10 and the adjoining sides of the housing 1ª are interposed sheets of rubber or other similar yielding and elastic or flexible material 13, these sheets serving as thin flexible diaphragms and being securely clamped between the covers 10 and the housing near the edges of said covers, it being noted that the bolts or pins 14 not only pass through the covers 10 and the housing 1ª, but also through the intermediate sheets of rubber 13. These sheets of rubber are provided with openings for the passage of the axle 4 and the steering member 5, and are formed with thickened collars or bosses 47 around the axle 4, and with similar thickened collars or bosses 48 around the steering member 5. Around these collars or bosses are placed respectively protecting metallic split shells 49 and 50 that are held securely in place respectively upon the axle 4 and the steering member 5 by means of split clamps 51 and 52.

Thus it will be seen that during the oscillation of the housing, while the springs are being flexed in their adjustment to road conditions, the frame and its housings vibrate in relation to the axle and other parts, and the flexible diaphragms 13 easily stretch up and down and back and forth as may be required to permit the springs to perform their normal elastic functions without injury or disaster to any of the parts and without permitting the admission of any foreign outside injurious substances to the springs and associated parts. Said spring devices are effectually enhoused by the cellular construction of the members 1ª. A perfect operation of the same in connection with interrelatively movable parts, like a vehicle frame and axle, is made possible by the interposition of the flexible diaphragms arranged as I described and protected in whole or in part by the metallic covers 10. Of course, when a diaphragm wears out, which it will not do for a long time, but may do eventually after being exposed to the weather and constant action in stretching or being stretched in one direction or the other, it may be necessary to substitute a new one, but this can be done very quickly by a simple removal of the cover plate 10. The covers 10 may be made in one or more parts. This may also be said of the diaphragms.

The description of the inclosing compartments 1ᵇ, 1ᵇ at the rear of the main frame for containing the rear spring devices, is substantially the same as that for the front compartments 1ª, 1ª. In fact, as the two housings are practically the same in form they might be made interchangeable if desired. These compartments 1ᵇ, 1ᵇ are shown in detail in Figs. 2, 5, 6, and 8. It has already been stated that the housing effect is produced by the use of a hollow frame 1ᵇ and the welded inner plate 44 which forms the inside member of the longitudinal sides of the frame. Within this housing, as the drawings designate, particularly the sectional view in Fig. 8, will be seen a full elliptic spring consisting of the upper half elliptic portion 25 and the lower half elliptic portion 26, which at both of their ends are connected together by links 27 pivotally attached to pins 29 carried by the leaves 26, and at their lower ends to pins 28 carried by the ends of the leaves 25, and all supported and arranged in a convenient way the upper part 25 of the spring being connected by shackles 53 to a pin 21 which is supported in the sides of the housing (see Fig. 8) and the lower portion 26 of the spring being securely fastened by shackle 54 to the rear axle 30. Of course, this elliptic spring thus described is simply introduced here by way of illustration and as a specimen of spring device that can be employed, but it is one that is very commonly used as the rear yielding support for the body of an automobile, elliptical springs placed across the rear axles of vehicles and parallel to the sides of the frame being considered an effective elastic or spring support for the bodies of the same. Horizontally through the rear portions of the frame which we are now considering, pass the rear axle 30 and adjacent thereto, the rod or tubular member 31 which may form a portion of the brake shaft devices and which is necessarily used with many forms of automobile construction. The sides of each of these housings 1ᵇ have oppositely-located openings 55, as indicated in Fig. 8, which are similar to the openings 46 in the housings 1ᵃ, and said openings 55 are covered by plates 20 held in place by a series of screw bolts 14 on the ends of which are slotted nuts, as shown, there being rubber diaphragms 24 similar to diaphragms 13 interposed between the covers 20 and the walls of the housings 1ᵇ around the edges of the openings 55, the bolts 14 passing through not only the covers 20 and the walls of the housing but also the edges of the diaphragms 24. These diaphragms 24, like the diaphragms 13, may not only at times be made of rubber, but can also be made of any other substitute elastic material which will serve the purpose. The covers 20 are provided each with an opening 22 which surrounds the axle 30 and with another opening 23 that surrounds the brake shaft element 31 so as to give proper vertical play or otherwise to the frame as it oscillates with relation to these features. It will, of course, be understood that each flexible diaphragm 24 like its counterpart 13 stretches away from and toward the relatively fixed elements 30 and 31 during the action of the springs as the latter yield in consequence of the road conditions which affect the stability of the supported frame and body of the vehicle, and in this connection it is to be stated that the said diaphragms 24 are provided with an opening having a thickened periphery or boss at 61 which surrounds the rear axle 30 and is clamped thereto by the split metallic clamp 59 held in place by the clamping devices 60; and also these diaphragms 24 are provided with openings having thickened edges or bosses 33 which are clamped upon the brake member 31 by means of the split shells 36 held in place by split clamps 37. These features are not only very clearly pointed out in the enlarged sectional view of Fig. 8, but are also seen very effectively in their true relation in the horizontal sectional view in Fig. 6.

I have already referred to the bolt 21 which supports the upper half 25 of each of the rear elliptic springs and pivots the same to the frame member 1ᵇ. The detailed construction and arrangement of this bolt 21 is fully shown in the upper portion of Fig. 8 where it is seen that I preferably employ spools 56 inserted through openings in the wall of the member 1ᵇ and the welded inner plate 44, to which they are welded or otherwise firmly united, these two spools reaching inwardly and having between them the seating 57. Within the spools 56, therefore, the bolt 21 finds easy accommodation, said bolt having at one end a head which bears against one of the spools 56, while at the other end the bolt has a nut 58 which screws upon the screw-threaded section of the bolt up against the outer end of the other one of the spools 56, the tip of the bolt 21 being provided, if desired, with a cotter pin or lock-nut. Of course, these details may vary widely without exceeding the scope of the invention, but I only explain them here as they furnish one means suitable for the purpose.

Referring now to Fig. 11, it will be seen that the rear housing 1ᵇ which is employed at each side of the frame at the back of the same is substantially the same as in the other views of the drawing, except that its outer configuration is slightly modified, and with this form of housing I employ the same outer cover plates 20 having openings 22 and 23 for the axle 30 and the brake shaft member 31, and also the interposed flexible diaphragms 24 arranged and functioning the same as in Figs. 5, 6, and 8. The type of spring however in this particular form of the invention is a cantaliver spring 38. Said spring 38 is secured by any convenient shackle device 32 to the pin or bolt 39 which is supported transversely in the walls of the housing 1ᵇ. The rear end of this spring is suitably connected by any clamping or shackling device 34 to the rear axle 30, while the front end thereof is loosely connected by means of a link 35 to a pin or bolt 62 which is supported in any convenient way in a transverse position in the walls of the housing 1ᵇ, as shown in Fig. 11; hence, in this figure the only substantial difference is the type of spring, and I am here illustrating, therefore, how my improved cellular frame can be adapted to another form of rear spring. Of course, this same type of spring can be used with the front axle also and the front housings changed only as required in the description already given.

Referring to Figs. 15, 16, and 17, I have represented therein another form of the invention. The rear of the frame is here taken for the purpose of illustration and the two counterpart housings 1ᵇ, 1ᵇ are shown connected together by a hollow horizontal cross-beam or transverse housing 1ᶜ, in which is located a transverse spring 42, the ends of which connect by means of links 68 pivoted thereto and to the ends of the two half elliptic springs 40, one of which is situated within each of the housings 1$^b$. These housings 1$^b$ are substantially the same as that shown in Figs. 5, 6, and 8, and it is unnecessary to repeat the description further than to say that they are provided with lateral openings fitted with resilient diaphragms 24 and slotted covers 20, through which pass the horizontal rear axle 30 and the parallel brake shaft member 31 so that the function and use of the parts may be substantially as I have hereinabove already set forth in reference to similar constructions. The elliptical springs 40 are supported at their front ends by horizontal bolts 41 that pass through the walls of the housing 1$^b$, and said springs are connected by means of shackle devices 43 with the rear axle 30. The details by which the proper loose pivotal connections between the extreme ends of the transverse spring 42 and the rear ends of the elliptical springs 40 is accomplished may vary within wide limits, and I do not wish to be restricted to any particular form, neither is it necessary to set forth in my description the precise details thereof further than to refer to them as I have already done as links, pins, and bolts, of proper size and shape. It is desirable at times to obtain access to the connections between the ends of the spring 42 and the springs 40, not only when the parts are being assembled but also for purposes of repair and adjustment, and to this end I find it convenient to provide the sides of the housings 1$^b$ with openings furnished with removable covers 64 held in place by any suitable kind of bolts 65. Obviously the housings 1$^b$ will be furnished at the proper point with a hand hole for the introduction of the springs 40 in like manner as I have already described with reference to the other forms of housings, the cover for said hand hole being held in place by some suitable screw device, as for example, that shown at 66.

The size and shape of the cross-connection 1$^c$ may vary within wide limits. It serves the same function as the other housings 1$^a$ and 1$^b$ in that it protects one or more springs and their bolts, shackles, etc. from injury, makes them permanent and efficient, and serves to enable them to retain their elasticity unimpaired through long periods of use; also the car can be more readily cleaned and washed than when there are many exposed points to catch dust and oil. The spring 42 is securely fastened at its central point otherwise to the upper part of the housing 1$^c$ by means of the shackles 43$^a$.

It will be obvious that many changes may be made in the precise construction and relative arrangement of the various parts, the sum of which I have recited with considerable fullness of detail, and I therefore reserve the liberty of making all changes that may be needed in the features of the construction and combination for the purpose of getting the best results in practice. I wish, however, to emphasize again that the leading and paramount feature of the invention consists in the provision in an automobile or vehicle frame of a cell or compartment which will effectually house the springs and other parts so that they may be durable and elastic, so that a neat appearance may be presented at all times, and an easy cleaning be effected.

Having thus described my invention, what I claim as new and desire to secure by Letters Patent, is:

1. A frame for automobiles and other vehicles, having a cell or compartment completely covering the resilient means of said vehicle, and provided with means to compensate for the movement of the parts.

2. A frame for automobiles and other vehicles provided with a cell or pocket for completely covering and containing the spring members of the vehicle, said cell or pocket having a yielding member to compensate for the play of the frame.

3. In a frame for automobiles and other vehicles, the combination with the springs, of a frame having sides which are hollow throughout and each shaped at the ends to form housings to completely contain the springs, and means for connecting the sides together.

4. In a frame for automobiles and other vehicles, the combination with the springs, of a frame having longitudinal sides at the ends of which are cells or compartments for inclosing the springs, and means for bracing the longitudinal sides together.

5. A frame for automobiles and other vehicles having pockets or compartments for covering the resilient mechanism on which the frame is mounted, said pockets or compartments being provided with elastic means to compensate for the play between the frame and the relatively stationary parts of the vehicle.

6. In a frame for automobiles and other vehicles, the combination with an axle and springs attached thereto, of a frame having a housing in which the springs are completely inclosed, said housing embracing the axle and being provided with an elastic diaphragm attached to the axle, which permits the oscillation of the frame under the spring action without injury to the housing.

7. In a frame for automobiles and other vehicles, the combination with an axle and yielding members carried thereby, of a frame having a housing in which the yielding members are completely inclosed, said housing being arranged with the axle passing through the same and being provided with a movable section attached to the axle which permits an oscillation of the frame relatively to the axle.

8. In a frame for automobiles and other vehicles, the combination with an axle and yielding members carried thereby, of a frame having a housing for the yielding members, said housing being laterally apertured for the passage of the axle and having a movable member in connection with said aperture which is attached to the housing and also to the axle.

9. In a frame for automobiles and other vehicles, the combination of an axle, a frame having a housing through which the axle passes transversely, a spring within said housing which is attached to the axle and also to the housing, elastic means attached to the axle and also to the housing, and permitting an oscillatory movement of the housing under the influence of the spring, and a protector for said elastic means.

10. In a frame for automobiles and other vehicles, the combination with an axle and yielding members attached thereto, of a frame having a housing in which the yielding members are completely inclosed, said housing being provided with lateral apertures through which the axle passes and also provided with elastic diaphragms in said apertures which are attached to the axle.

11. In a frame for automobiles and other vehicles, the combination with an axle and yielding members supported thereon, of a frame having a housing provided with lateral apertures through which the axle passes, flexible diaphragms covering said apertures and attached to the axle, and external protectors for said diaphragms, the latter being secured to the sides of the housing.

12. In a frame for automobiles and other vehicles, the combination with an axle and yielding members supported thereon, of a frame having a laterally-apertured housing through which the axle passes, elastic diaphragms covering the apertures and themselves apertured for the passage of the axle, and slotted protecting covers outside of the elastic diaphragms and secured to the sides of the housing.

13. In a frame for automobiles and other vehicles, the combination with an axle and yielding members supported thereon, of a frame having a housing for the yielding members, said housing having lateral openings through which the axle passes, elastic diaphragms covering said apertures and secured to the housing and having an opening through which the axle passes, the diaphragms being provided with a boss around said opening, and a clamp for holding the diaphragm boss securely upon the axle.

14. In a frame for automobiles and other vehicles, the combination with an axle and yielding members supported thereon, of a frame having a housing in which the yielding members are entirely inclosed, said housing having oppositely-located openings through which the axle passes, flexible diaphragms placed over said openings and perforated to receive the axle, a clamp for holding the diaphragm tightly upon the axle, and a slotted protecting cover for the diaphragm which is secured to the housing.

15. In a frame for automobiles and other vehicles, the combination with the axles and yielding members supported thereon, of a frame having longitudinal sides at the front and rear of each of which is a cell or compartment for inclosing the yielding members at that point, and cross-braces for connecting said longitudinal sides into a rigid structure.

16. In a frame for automobiles and other vehicles, the combination with the axles and springs, of a frame having sides which are hollow throughout and are shaped at the ends to form housings to contain the springs, and means connecting said sides together for the purpose of forming a rigid structure.

17. In a frame for automobiles and other vehicles, the combination of axles, springs supported thereon, a frame having hollow longitudinal sides formed at certain points with pockets to contain the springs and provided with inner walls securely united to the angular outer portions of said sides, together with cross-connecting means for holding the sides in a rigid combination.

18. In a frame for automobiles and other vehicles, the combination with the axles and the springs carried thereby, of a frame having front and rear housings for completely inclosing the front and rear springs, said housings being provided with elastic diaphragms attached thereto and to the axles, connections between the opposite sides of the frame for the purpose of holding the parts together in a single rigid structure.

19. In a frame for automobiles and other vehicles, the combination with the axles and yielding members supported thereon, of a frame having parallel longitudinal sides provided with a plurality of cells or compartments for containing the yielding members, said cells being apertured to permit the axles to pass through the same, flexible diaphragms attached to the cells and to the axles, and a hollow cross-connection between the parallel sides for receiving a transverse spring.

20. In a frame for automobiles and other vehicles, the combination with front and rear axles and other transverse operating members and the spring devices mounted on said axles, of a frame having parallel longitudinal sides provided with front and rear housings for containing the spring devices, elastic covers for lateral openings in the housings, which covers are attached to the latter and to the axles, and means supported in the cells of the housings for carrying the spring devices.

21. In a frame for automobiles and other vehicles, the combination of the axles, a steering member contiguous to one of them, a brake operating member contiguous to the other, spring devices mounted on the axles, a cellular frame whose cells contain and protect the spring devices, said cells being laterally apertured, elastic covers for said apertures, and slotted protecting plates for said elastic covers, whose slots are so shaped as to accommodate the passage of the axles and other transverse operating members.

22. A frame for automobiles and other vehicles consisting in the combination with hollow longitudinal sides having cells or pockets therein for protecting the springs, of elastic diaphragms arranged in connection with openings in said pockets and attached to the pockets and to the axle, and means for securing the springs to the axle and also to the pocket.

In testimony whereof I hereunto affix my signature.

WILLIAM J. P. MOORE.